US012552421B2

(12) United States Patent
Castelli et al.

(10) Patent No.: US 12,552,421 B2
(45) Date of Patent: Feb. 17, 2026

(54) RAIL VEHICLE WITH DILATION PROFILE, METHOD OF MANUFACTURING A RAIL VEHICLE AND DILATION PROFILE

(71) Applicant: Stadler Rail AG, Bussnang (CH)

(72) Inventors: Benedetto Castelli, Buchs (CH); Andreas Gmür, Heiden (CH); Dominik Kläusler, St. Gallen (CH)

(73) Assignee: Stadler Rail AG, Bussnang (CH)

( * ) Notice: Subject to any disclaimer, the term of this patent is extended or adjusted under 35 U.S.C. 154(b) by 995 days.

(21) Appl. No.: 17/708,053

(22) Filed: Mar. 30, 2022

(65) Prior Publication Data
US 2022/0315065 A1    Oct. 6, 2022

(30) Foreign Application Priority Data

Mar. 31, 2021   (EP) .................................... 21166331

(51) Int. Cl.
*B61D 17/10*    (2006.01)
*B61D 1/06*     (2006.01)
*B61D 17/04*    (2006.01)

(52) U.S. Cl.
CPC .............. *B61D 17/10* (2013.01); *B61D 1/06* (2013.01); *B61D 17/043* (2013.01)

(58) Field of Classification Search
CPC ......... B61D 1/06; B61D 17/10; B61D 17/043
USPC ................. 105/396, 370, 414, 422
See application file for complete search history.

(56) References Cited

U.S. PATENT DOCUMENTS

2008/0163783 A1*   7/2008   Nakamura ........... B61D 17/041
                                                         105/401
2017/0008538 A1    1/2017   Ackermann et al.

FOREIGN PATENT DOCUMENTS

| DE | 20 2013 006 759 U1 | 10/2013 | |
| DE | 10 2014 201 109 A1 | 7/2015 | |
| EP |       905000 A1 *  | 3/1999  | ............... B61D 1/06 |
| EP |     2 907 719 A1   | 8/2015  | |
| EP |     3326882 A1 *   | 5/2018  | ............. B61C 17/00 |
| FR |     3 037 858 A1   | 12/2016 | |

OTHER PUBLICATIONS

European Search Report Corresponding to 21166331.5 mailed Sep. 21, 2021.

* cited by examiner

*Primary Examiner* — S. Joseph Morano
*Assistant Examiner* — Heaven R Buffington
(74) *Attorney, Agent, or Firm* — Finch & Maloney PLLC

(57) ABSTRACT

The invention relates to a rail vehicle having a car body comprising an upper level and a lower level separated by an intermediate floor. The intermediate floor comprises at least two intermediate floor elements, the intermediate floor elements being arranged one behind the other in the longitudinal direction of the rail vehicle. A dilation profile is disposed between a first and second intermediate floor element.

20 Claims, 4 Drawing Sheets

Figure 1:
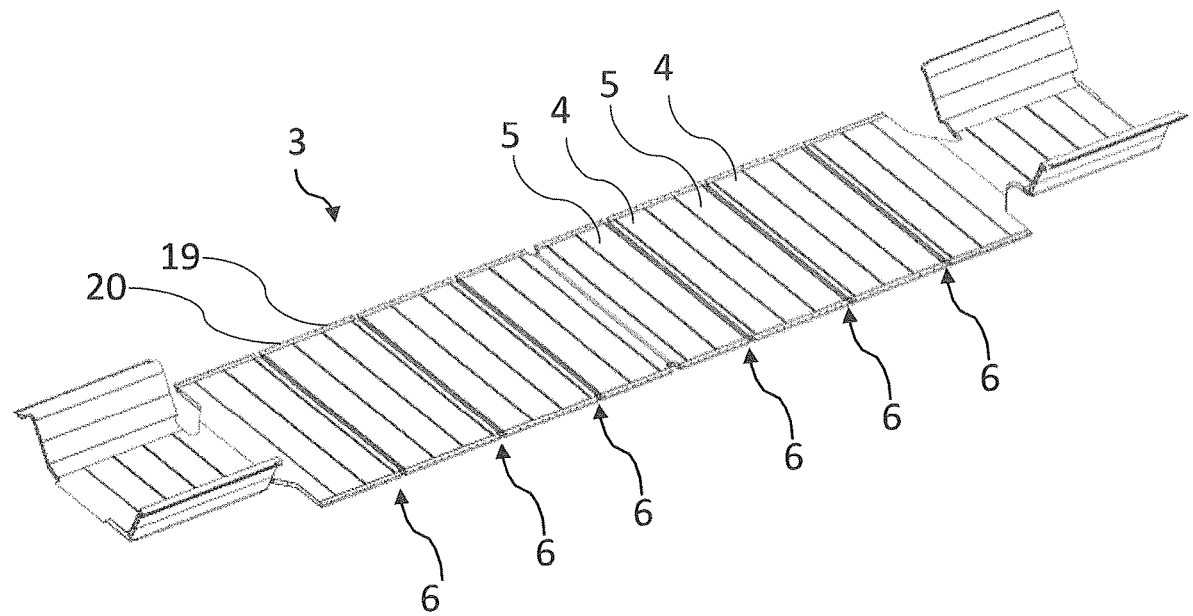

RAIL VEHICLE WITH DILATION PROFILE, METHOD OF MANUFACTURING A RAIL VEHICLE AND DILATION PROFILE

The present invention relates to a rail vehicle having a dilation profile, a method of manufacturing a rail vehicle, and a dilation profile.

A rail vehicle according to the prior art has an intermediate floor which is connected to the structure of the car body by means of connecting elements. This intermediate floor is optimized with respect to heat conduction, condensation, and thermal insulation.

The intermediate floor is preferably made of thin, double-walled aluminum extrusions with vertical ribbing.

The intermediate floor often features underfloor heating to warm up the passenger compartment. Underfloor heating, such as electric resistance heating, in the intermediate floor elements ensures rapid heating of the car interior to up to 27° C.

Outside the car body of a rail vehicle, ambient temperatures can be in a range of at least −40° C. to 35° C. Therefore, a passenger compartment of a rail vehicle must withstand strong temperature fluctuations and repeated cooling and heating. Particularly during breaks in operation, for example at night, the rail vehicle cools down and has to be heated up again to be able to accommodate passengers once more. At temperature differences of at least 75 Kelvin, the intermediate floors made of extruded aluminum profiles widely used in the prior art are thus subjected to severe stress. This effect is additionally intensified because the underfloor heating in such rail vehicles is often arranged at least partially in or on the intermediate floor. This results in thermal deformations and stresses which, especially along the longest dimension, in the longitudinal directions of the car body, strongly stress the material of the intermediate floor.

However, a potential solution by separating the intermediate floor into individual intermediate floor elements has the disadvantage that the vertical stiffness of the intermediate floor is greatly reduced. In addition, the insulating properties in terms of heat, acoustics and water permeability are severely compromised by separating the intermediate floor.

It is therefore the task of the present invention to solve the disadvantages of the prior art and, in particular, to provide a rail vehicle and a dilation profile which simultaneously withstands thermal dimensions and exhibits high stability.

The task is solved by a rail vehicle, a method for manufacturing a rail vehicle and a dilation profile according to the independent claims.

In particular, the problem is solved by a rail vehicle comprising a car body having an upper level and a lower level, and an intermediate floor separating the upper level from the lower level. The intermediate floor comprises at least two intermediate floor elements arranged one behind the other in a longitudinal direction of the rail vehicle. A dilation profile is arranged between a first intermediate floor element and a second intermediate floor element.

Such a rail vehicle exhibits little stress in the intermediate floor due to thermal deformation.

For this purpose, the dilation profile can elastically compensate the deformations depending on the direction. Thermal expansion and contraction along the longitudinal direction of the rail vehicle is particularly important due to the large dimension of the intermediate floor in this direction.

The surfaces of the dilation profile adjacent to the intermediate floor elements are called floor element contact surfaces. The floor element contact surfaces of the dilation profile are preferably adjacent along the entire length of the adjacent intermediate floor elements. Preferably, the longitudinal axis of the dilation profile is oriented substantially transverse to the longitudinal axis of the car body. However, other orientations of the dilation profile are also conceivable.

The profile surfaces of the dilation profile designate the surfaces of the dilation profile connecting the floor element contact surfaces of the dilation profile. Preferably, the dilation profile has two profile surfaces. Preferably, due to the floor element contact surfaces and profile surfaces, the dilation profile has a substantially at least partially rectangular cross-sectional profile.

Preferably, a dilation profile has a width of the profile surfaces in the longitudinal direction of the car body of 3 to 15 cm, in particular preferably 5 to 8 cm. The vertical height of the attached dilation profile is preferably 3 to 15 cm, more preferably 4 to 8 cm. In the transverse direction of the car body, the dilation profile preferably extends over almost the entire width of the intermediate floor.

The thermal expansion and contraction of the intermediate floor results from the product of the temperature difference $\Delta T$ and the material-specific coefficient of thermal expansion a.

Thus, for a thermal expansion or contraction of aluminum with $\alpha=23.1\times10\text{-}6\ K^{-1}$, a temperature difference of $\Delta T=65$ K results in a relative dimension of $\Delta l/l0=\alpha\Delta T=1.5$ mm/m.

The material-specific thermal expansion thus determines the number of dilation profiles required and the distance between the dilation profiles. The number of dilation profiles of the intermediate floor is preferably selected so that the thermal deformation of the intermediate floor in the longitudinal direction of the car body is in an elastic range due to the dilation profiles.

Preferably, the dilation profiles are designed such that they have a force-displacement relationship that is as linear as possible in this thermal expansion/contraction range of at least 65 K, i.e. they are elastically deformable.

Preferably, the dilation profiles also cause reduced thermal conductivity between the intermediate floor elements of the intermediate floor. Thus, thermally induced stresses in the intermediate floor can additionally be reduced.

The attachment of a dilation profile between an intermediate floor element and/or other elements of the rail vehicle would also be conceivable.

The intermediate floor elements may comprise plastic, steel and/or light metal.

These materials have high durability and elastic properties, are also inexpensive, and support the structural integrity of an intermediate floor. Further, these materials are well suited for extrusion or extrusion in the manufacture of the intermediate floor.

High stiffness of the materials is particularly advantageous, so that the intermediate floor can still perform a load-bearing function as a lightweight structure.

The dilation profile of the rail vehicle can comprise an elastomeric plastic and/or metal, in particular light metal, and in particular be produced by extrusion.

Elastomeric plastics and/or metal, in particular light metal, are particularly well suited for a dilation profile because they have good elastic properties.

Moreover, the elastic properties of the dilation profile can be well formed by a special shape of the dilation profile using these materials.

Elastic in this context means that almost all the energy is absorbed by the structure, shape and/or material of the dilation profile by reversible deformation. The loss of energy by irreversible deformation, i.e. plastic deformation, and/or generation of heat is preferably minimized.

Furthermore, these materials of the dilation profile are well suited to be bonded to the intermediate floor elements.

The dilation profile of the rail vehicle can be designed to be anisotropic to force application.

In this context, anisotropic to force action means that there is a different stiffness in the respective directions of the dilation profile.

The dilation profile is preferably formed by an elastic structure and/or shape in the more compliant in the transverse direction than in its longitudinal direction.

The dilation profile can be made anisotropic to force by geometric design and/or by choice of material.

Analogous to a, preferably essentially linear, restoring force of a spring, the structure, in particular geometric structure, of the dilation profile can thus selectively increase the elasticity of the intermediate floor in addition to the material.

The elastic structure and/or the shape of the dilation profile preferably result from a cross-sectional reduction in a region of the dilation profile along the transverse direction of the dilation profile.

This cross-sectional reduction may extend along the entire longitudinal direction of the dilation profile, or may be located only in a region of the dilation profile.

The cross-sectional reduction of the dilation profile is preferably arranged in such a way that deformation of the dilation profile in the transverse direction can be elastically absorbed.

For this purpose, the dilation profile must comprise an at least partially elastic material so that the dilation profile can form an elastic structure and/or shape. The material, structure and/or shape of the dilation profile should prevent plastic deformation due to thermal expansion during deflection-conforming operation, so that the dilation profile can resume its initial shape.

The dilation profile can also be made anisotropic to force by the choice of material and/or combination of materials with a particular orientation, such as layering along a direction. In this context, the use of multi-component elastomeric plastics as material for the dilation profile would be conceivable.

The intermediate floor in the direction of the transverse axis of the car body is exposed to significantly less thermally induced stresses due to thermal expansion/contraction, since the intermediate floor has a smaller dimension in this direction. However, it would also be conceivable to use dilation profiles to increase elasticity in the transverse direction of the car body.

The dilation profile of the rail vehicle can be connected to the first intermediate floor element and the second intermediate floor element by adhesive bonding and/or welding, in particular friction stir welding.

The intermediate floor with dilation profile preferably has high rigidity in the vertical direction when properly attached, since the intermediate floor as a load-bearing element must support the weight from the train interior equipment and passengers.

Without a dilation profile connecting the intermediate floor elements, each intermediate floor element would have to bear the vertical load alone. A bonded and/or welded dilation profile of the intermediate floor can thus distribute the vertical load in the horizontal direction.

The high vertical stiffness achieved by the structure thus allows a thin intermediate floor and/or less material consumption for the same load-bearing capacity compared to separate intermediate floor elements. In addition, additional stiffening measures can preferably be dispensed with.

Adhesive bonding and/or welding of the dilation profile is also particularly advantageous, as this creates an insulating intermediate floor.

The adhesive bonding and/or welding of the dilation profile to the intermediate floor elements is also preferably designed to be essentially impermeable to water. Thus, water entrapment, corrosion of material and condensation are minimized.

This is particularly advantageous with respect to a heating device and/or electronics that may be disposed in the intermediate floor.

Such an intermediate floor is also advantageous in terms of acoustics and fire protection. By means of a preferably fully connected intermediate floor, the acoustic damping is increased and thus the volume due to voices and driving noises is reduced.

The intermediate floor elements are preferably connected exclusively by adhesive bonding and/or welding of the dilation profile. Such an arrangement makes it possible to produce the intermediate floor without additional fastening elements.

To this end, the dilation profile and the first and second intermediate floor elements preferably have substantially the same vertical height dimension.

Thus, the intermediate floor preferably forms a substantially horizontal surface at the area of adhesive bonding and/or welding, so that this area has substantially no vertical height differences.

This embodiment provides good passability of the intermediate floor for passengers.

The adhesive bonding of the dilation profile to the intermediate floor elements preferably extends over the entire floor element contact surface of the dilation profile.

The welding of the dilation profile to the intermediate floor elements preferably extends along the longitudinal edges of the profile. Thus, the area where the adhesive bonding and/or welding occurs is maximized and thus reinforced.

Friction stir welding is a particularly advantageous process for welding the dilation profile to the intermediate floor elements. A friction stir welding process ensures good mechanical properties and low distortion of the material. In addition, an almost smooth weld seam is produced with low heat input.

The cross-section of the dilation profile of the rail vehicle may have two floor element contact surfaces. The floor element contact surfaces have a greater dimension in cross-section than the dimension of an area substantially centered between the floor element contact surfaces parallel to the floor element contact surfaces.

Thus, an optimum ratio between stiffness and elasticity is achieved.

The dilation profiles can be arranged in longitudinal direction alternating with intermediate floor elements.

In this context, it is also conceivable for intermediate floor elements of the intermediate floor to be connected to one another without dilation profiles.

Preferably, however, the dilation profiles are arranged at regular intervals along the longitudinal direction of the car body between intermediate floor elements. Such an arrangement allows the thermally induced stresses and deformations to be evenly elastically balanced.

The smaller vertical dimension of an area substantially centered between the floor element contact surfaces preferably forms the elastic structure and/or shape of the dilation profile along the longitudinal direction of the car body.

In addition, such an arrangement avoids bulging of the intermediate floor upon deformation of the intermediate floor. Such bulging could pose a safety risk to passengers.

In addition, an elastic property of this area of the dilation profile ensures that the intermediate floor elements can deform more freely due to thermal expansion/contraction caused by temperature changes. The intermediate floor elements are not subjected to as much stress because the intermediate floor elements have a higher stiffness in the longitudinal direction of the car body than the dilation profile.

These dilation profiles are preferably made from an aluminum alloy by extrusion. The extrusion seams are preferably located in the area of the smaller dimension in the dilation profile. The extrusion seams should preferably be located in an area of low thermal stress, as this is a weak point in the dilation profile.

The combined elastic properties of the dilation profile due to this elastic structure and/or shape and the material properties determine how many dilation profiles are needed in the intermediate floor. Therefore, the dimensions of the dilation profile should be optimized in terms of the resulting lengths and number of intermediate floor elements and manufacturing effort.

The stiffness in the vertical direction of an intermediate floor with such a dilation profile is approximately as large as a continuous intermediate floor without dilation profiles, which consists of exclusively connected rectangular chamber profiles.

Compared to such a continuous intermediate floor, the intermediate floor according to the invention behaves as follows:
   The vertical stiffness of the intermediate floor is reduced by only 5-10%.
   In the direction transverse to the car body, the stiffness of the intermediate floor is essentially the same.
   In the direction lengthwise to the car body, however, the stiffness is reduced by 50-60%.

The large reduction in stiffness in the longitudinal direction of the car body, with a simultaneous small reduction in stiffness in the vertical direction, is a major advantage of the intermediate floor according to the invention.

The intermediate floor elements of the rail vehicle can be connected to the side walls of the car body, preferably by welding and/or a fastening element, in particular preferably by rivets.

When arranging the dilation profiles and intermediate floor elements, the load on the welding and/or fastening elements must be taken into account. In areas of high load, the number of weldings and/or fastening elements is preferably increased.

Thermal insulation elements may be arranged between the side wall of the car body and the intermediate floor elements.

The thermal insulation elements of the intermediate floor are advantageous because the car body may have a high temperature difference from the intermediate floor due to the outside temperature.

The thermal insulation elements serve to reduce the thermal conductivity between the intermediate floor elements and the car body and to reduce induced thermal stresses of the intermediate floor. In addition, this reduces the energy required for heating by reducing heat transfer from the interior to the exterior.

Preferably, the side wall of the car body has integral beams so that the thermal insulation elements can be arranged between the beams and the intermediate floor elements.

In a preferred embodiment, the intermediate floor has at least one longitudinal profile. This longitudinal profile can be arranged on both sides of the intermediate floor along the longitudinal direction to the car body. The longitudinal profile is preferably used for fastening the intermediate floor to the sides of the car body by fastening means.

In particular, these longitudinal profiles can be arranged spaced apart in the area of the dilation profiles with gaps to allow for thermal deformation of the intermediate floor.

In addition, several intermediate floor elements are preferably connected to each other by a longitudinal profile.

For this purpose, the longitudinal profile is preferably welded to the intermediate floor elements and can be attached to the thermal insulation elements of the supports of the side wall.

The problem is further solved by a method for manufacturing a rail vehicle as previously described, comprising the following step:
   connecting a dilation profile to two intermediate floor elements by welding, in particular friction stir welding, to produce the intermediate floor.

The problem is further solved by a dilation profile for connecting two intermediate floor elements, which comprises a dilation profile body with a cross-section having two floor element contact surfaces and two profile surfaces substantially perpendicular thereto. The dilation profile may be anisotropic to force. The floor element contact surfaces preferably have a dimension greater than the dimension of an area of the dilation profile body substantially centered between the floor element contact surfaces parallel to the floor element contact surfaces in cross-section.

Such a dilation profile shape provides an intermediate floor of intermediate floor elements and dilation profiles with high stiffness in the vertical direction. The stiffness of the intermediate floor in the longitudinal direction of the car body can thus be significantly lower than the stiffness of the intermediate floor in the transverse direction of the car body.

The profile surfaces of the dilation profile may have a longer dimension in the cross-section of the dilation profile than the floor element contact surfaces in the cross-section of the dilation profile.

A longer dimension of the profile surfaces of the dilation profile is preferred. Thus, the profile surface has sufficient space for an elastic structure and/or shape in the central region of the dilation profile. This area preferably enhances the elastic properties of the dilation profile for thermal expansion and contraction of the intermediate floor elements in addition to the elastic material properties.

Furthermore, a longer dimension of the profile surface in the cross-section of the dilation profile compared to the floor element contact surfaces of the dilation profile indicates the lightweight character of the intermediate floor.

Such a dilation profile means that the intermediate floor does not have to have a high vertical dimension to act as a load-bearing structure.

The profile surfaces of the dilation profile can each have a groove in their central area.

This groove is preferably formed along the longitudinal axis of the dilation profile, substantially in the center of the profile surface.

The groove preferably represents an elastic structure and/or shape.

The groove preferably has, at least in part, substantially vertical surface areas relative to the horizontal orientation of the intermediate floor.

These surface areas of the dilation profile are preferably oriented such that the dilation profile is more easily deformable than the intermediate floor elements in the longitudinal direction of the car body.

Thus, deformation of the intermediate floor elements is avoided.

In addition, the dilation profile is designed to be more elastic than the intermediate floor elements, thus leading to the avoidance of plastic deformation of the intermediate floor.

The groove of the dilation profile may have a groove outer region in the cross-section of the dilation profile, which has a smaller minimum dimension in the transverse direction of the dilation profile than the maximum dimension of the groove inner region in the transverse direction of the dilation profile.

The groove outer region of the groove denotes an opening region of the groove in the longitudinal direction of the dilation profile. The groove inner region refers to a region formed in the interior of the dilation profile after the opening region through the groove.

A groove outer region of smaller minimum dimension in cross-section than a maximum dimension of groove inner region results in good elastic properties of the dilation profile.

The material thickness of the dilation profile in the groove area is preferably reduced so that an elastic structure is formed in the transverse direction of the dilation profile. The reduced material thickness ensures reduced stiffness, so that the dilation profile can be more easily deformed and thus better compensate for thermal expansion/contraction.

Preferably, a groove of the dilation profile is arranged on both profile surfaces respectively.

In order to form an elastic structure, there is no connection between the profile surfaces except via the lateral floor element contact surfaces. This ensures the resilient property of the dilation profile.

The groove inner regions are therefore preferably not connected to each other, but have two separate bottom regions in cross-section.

Preferably, the dilation profile has a material thickness in the horizontal region of the profile surface of 1 to 10 mm, in particular preferably 2 to 3 mm.

Preferably, the dilation profile has a material thickness in the groove inner region or only in the bottom region of the groove inner region of 0.5 to 4 mm, in particular preferably 1 to 2 mm.

Due to a smaller dimension of the groove outer region compared to the dimension of the groove inner region, the elasticity of the profile in the transverse direction can be adapted by the shape of the groove, the material and the requirements.

The cross-section of the groove of the dilation profile can be concave-convex, in particular arc-shaped.

A concave-convex structure of the cross-section of the groove is particularly advantageous. A concave-convex structure has a good elastic structure. Thus, a good elastic deformability of the groove of the dilation profile in the transverse direction of the dilation profile is ensured.

The horizontal areas of the profile surface, on the other hand, are less deformed when force is applied in the transverse direction of the dilation profile.

A concave-convex shape distributes the force impact better and results in uniform loading of the material. Thus, a punctual material load on the groove of the dilation profile is preferably minimized and a longer durability of the dilation profile is achieved.

The task is further solved by a method for manufacturing a dilation profile as previously described, which comprises the following steps:
   extrusion of a dilation profile, preferably made of aluminum or an aluminum alloy
      a. or
   extruding at least one elastomeric plastic and/or a light metal to form a dilation profile.

In the manufacturing process, it can also be advantageous for the profile surfaces of the dilation profile to be connected during manufacture via a horizontal region in the area of the groove. This area can preferably be removed by milling after pressing to obtain a recessed elastic structure in the form of a groove.

Furthermore, it would also be conceivable to manufacture the dilation profile and the intermediate floor elements and/or the intermediate floor in one piece. This would have the advantage that no separate attachment would have to be made but is more demanding in terms of production technology.

Figure 2:
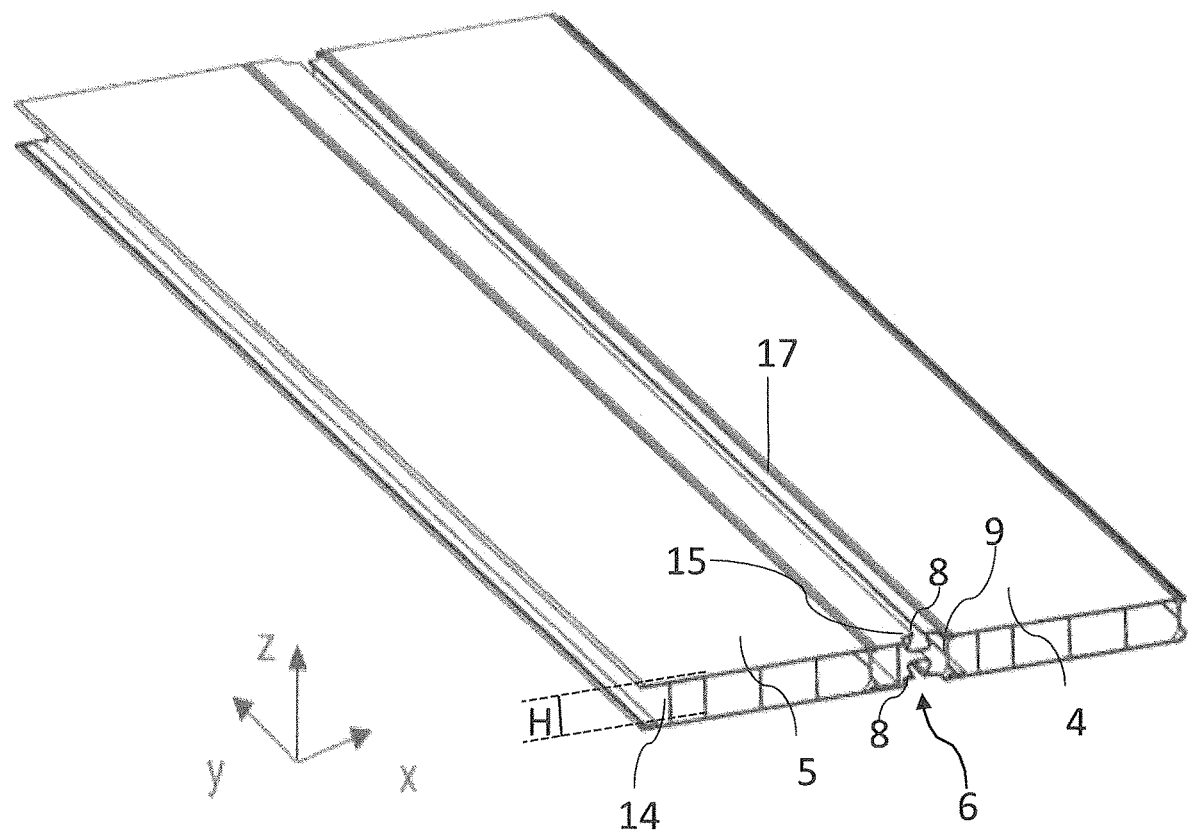
Figure 3:
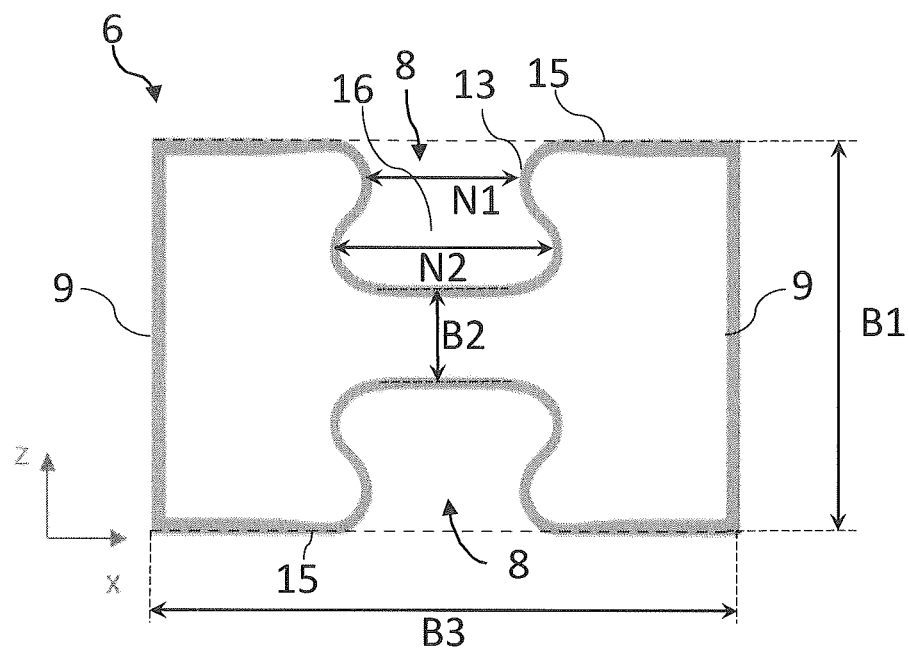
Figure 4:
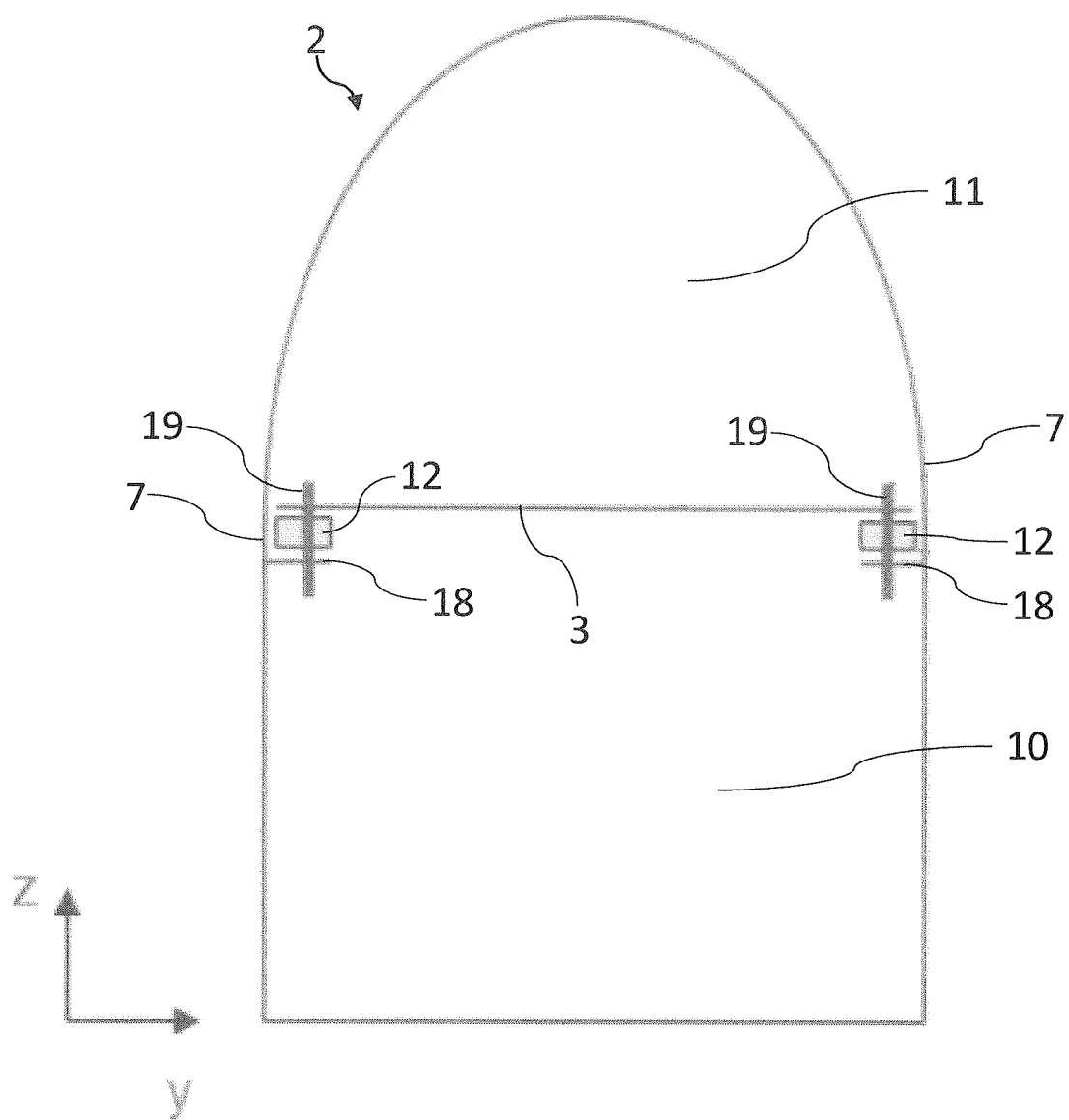

The inventions are explained in more detail below with the aid of figures:

FIG. 1: an embodiment of an intermediate floor of a rail vehicle;

FIG. 2: an embodiment of a dilation profile between two intermediate floor elements;

FIG. 3: an embodiment of a dilation profile in cross-section;

FIG. 4: an embodiment of a car body with an intermediate floor in cross-section.

FIG. 1 shows a version of an intermediate floor 3 of a rail vehicle for mounting in a car body. This intermediate floor serves to separate an upper level from a lower level.

The dilation profiles 6 are each arranged between two intermediate floor elements 4, 5. The dilation profiles 6 are arranged along the entire length of the intermediate floor 3 in the transverse direction, spacing some intermediate floor elements 4, 5 in the longitudinal direction of the intermediate floor 3.

The intermediate floor elements 4, 5 are made of double-walled and vertically-ribbed extruded aluminum profiles. The dilation profiles 6 are made of double-walled extruded aluminum profiles.

The intermediate floor elements 4, 5 are welded to the dilation profiles 6 by a friction stir welding process.

The number of dilation profiles 6 is adapted to the thermal deformation of the material and the length of the intermediate floor 3. The elastic range of the dilation profiles 6 should never be exceeded for all temperature ranges required in use.

In this embodiment, six dilation profiles 6 are arranged in the intermediate floor 3.

The dilation profiles 6 can elastically compensate for thermal expansion and contraction depending on the direction. The stiffness in the longitudinal direction of the intermediate floor 3 is reduced by the dilation profiles 6. The vertical stiffness of the intermediate floor 3, on the other hand, is reduced to a lesser extent.

To this end, the dilation profiles 6 are spaced at regular intervals as far as possible.

Longitudinal profiles 20 are attached to the sides of the intermediate floor 3, connecting a plurality of intermediate floor elements 4, 5. The longitudinal profiles 20 can be connected to supports 18 of the side wall 7 (not shown in FIG. 1) by fastening elements 19. In the area of high load, the distances between the fastening elements 19 are reduced so that the fastening elements 19 are not overloaded.

The fastening elements 19 in this design are rivets.

FIG. 2 shows two intermediate floor elements 4, 5 which are joined together by the dilation profile 6 by welding 17. Here, the intermediate floor elements 4, 5 and the dilation profile 6 have essentially the same vertical height H.

The ribs 14 of the intermediate floor elements 4, 5 increase the rigidity of the double-walled intermediate floor elements 4, 5.

A groove 8 is arranged on each of the upper and lower profile surfaces 15 and extends along the entire longitudinal axis of the dilation profile 6. The floor element contact surface 9 extends on both sides along the connection areas of the dilation profile 6 with the intermediate floor elements 4, 5.

FIG. 3 shows an embodiment of the dilation profile 6 in cross-section. The floor element contact surfaces 9 are arranged laterally and are provided for connection to the intermediate floor elements 4, 5. The profile surfaces 15 are arranged at the top and bottom and have a groove 8. The groove outer region 13 has a smaller minimum dimension N1 than the maximum dimension N2 of the groove inner region 16.

The dimension B1 of the dilation profile 6 along the floor element contact surfaces 9 is smaller than the dimension B3 along the profile surface 15 of the dilation profile. The cross-section of the dilation profile 6 is substantially rectangular.

The bottom portions of the upper and lower grooves 8 have no connection and are spaced apart by a distance B2. Thus, the groove 8 can act as a resilient structure and thermal deformation in the transverse direction x of the dilation profile 6 can be elastically compensated. This resilient property of the dilation profile is supported by the fact that the material thickness in the area of the groove 8, the concave-convex structure and the bottom area of the groove is 1.6 mm. The remaining area of the profile surface 15, however, has a higher material thickness of 2.2 mm.

As can be seen in FIG. 3, the groove 8 is designed as a concave-convex curved structure in cross-section. In this way, the force is distributed as evenly as possible over a larger area of the groove 8 by deformation.

FIG. 4 shows an embodiment of a car body 2 with an intermediate floor 3 in cross section. The intermediate floor 3 separates an upper level 11 and a lower level 10. The intermediate floor 3 is attached by rivets as fastening elements 19 to a support 18 of each side wall 7.

A thermal insulation element 12 is also arranged between the support 18 of the side wall 7. The thermal insulation element 12 minimizes the thermal conductivity between the side wall 7 of the car body 2 and the intermediate floor 3.

The invention claimed is:

1. A rail vehicle comprising a car body having an upper and a lower level and an intermediate floor separating the upper level from the lower level, wherein the intermediate floor comprises at least two intermediate floor elements, wherein a first intermediate floor element is arranged behind a second intermediate floor element in a longitudinal direction of the rail vehicle and wherein the first intermediate floor element comprises an upper floor area, wherein a dilation profile is arranged between the first intermediate floor element and the second intermediate floor element and the dilation profile comprising a dilation profile body which has a cross-section having two floor element contact surfaces and two profile surfaces substantially perpendicular thereto and wherein the two profile surfaces are substantially parallel to the upper floor area of the first intermediate floor element and the profile surfaces each have a groove in a central region of the profile surface.

2. The rail vehicle according to claim 1, wherein the intermediate floor elements comprise at least one of plastic, steel, and light metal.

3. The rail vehicle according to claim 1, wherein the dilation profile comprises at least one of an elastomeric plastic and metal.

4. The rail vehicle according to claim 1, wherein the dilation profile is anisotropic in stiffness in respective directions of the dilation profile.

5. The rail vehicle according to claim 1, wherein the dilation profile is connected to the first intermediate floor element and the second intermediate floor element by at least one of adhesive bonding and welding.

6. The rail vehicle according to claim 1, wherein a cross-section of the dilation profile comprises two floor element contact surfaces having a greater vertical height than a center vertical height of the dilation profile between the profile surface grooves.

7. The rail vehicle according to claim 1, wherein the intermediate floor elements are connected to side walls of the car body.

8. The rail vehicle according to claim 7, wherein thermal insulation elements are arranged between the side wall of the car body and the intermediate floor elements.

9. A method for manufacturing a rail vehicle according to claim 1, comprising:
   connecting a dilation profile to two intermediate floor elements by welding to produce the intermediate floor.

10. The method according to claim 9, comprising:
    connecting a dilation profile to two intermediate floor elements by stir welding to produce the intermediate floor.

11. The rail vehicle according to claim 1, wherein the dilation profile comprises a light metal.

12. The rail vehicle according to claim 1, wherein the dilation profile is connected to the first intermediate floor element and the second intermediate floor element by adhesive friction stir welding.

13. The rail vehicle according to claim 1, wherein the intermediate floor elements are connected to the side walls of the car body by one of welding and fastening elements.

14. A dilation profile for connecting two intermediate floor elements, comprising a dilation profile body which has a cross-section having two floor element contact surfaces and two profile surfaces substantially perpendicular thereto, and the profile surfaces each have a groove in a central region of the profile surface and the dilation profile being designed to be anisotropic in stiffness in respective directions of the dilation profile and wherein the profile surfaces have a greater horizontal width in the cross-section of the dilation profile than the vertical height of the floor element contact surfaces in the cross-section of the dilation profile.

15. The dilation profile according to claim 14, wherein the groove in the cross section of the dilation profile has a groove outer region and a groove inner region, and the groove outer region has a smaller minimum groove width than a maximum groove width of the groove inner region.

16. The dilation profile according to claim 15, wherein the cross-section of the groove is concave-convex.

17. A method of making the dilation profile according to claim 14, comprising:
    extrusion of the dilation profile made of aluminum or an aluminum alloy or extruding at least one of an elastomeric plastic and a light metal to form the dilation profile.

18. The dilation profile according to claim 14, wherein the floor element contact surfaces have a greater vertical height than a center vertical height of the dilation profile between the profile surface grooves.

19. A rail vehicle comprising a car body having an upper and a lower level and an intermediate floor separating the upper level from the lower level, wherein the intermediate floor comprises at least two intermediate floor elements, wherein a first intermediate floor element is arranged behind a second intermediate floor element in a longitudinal direction of the rail vehicle, wherein a dilation profile is arranged between the first intermediate floor element and the second intermediate floor element and the dilation profile comprises a light metal and the dilation profile is connected to the first intermediate floor element and the second intermediate floor element by at least one of adhesive bonding and welding and the dilation profile comprises two floor element contact surfaces and the horizontal width between the two floor element contact surfaces in the cross-section of the dilation profile is greater than the vertical height of the floor element contact surfaces in the cross-section of the dilation profile.

20. The rail vehicle according to claim 19, wherein the dilation profile is connected to the first intermediate floor element and the second intermediate floor element by adhesive friction stir welding.

\* \* \* \* \*